United States Patent
MacLean, III et al.

(10) Patent No.: US 7,791,455 B1
(45) Date of Patent: Sep. 7, 2010

(54) METHOD AND APPARATUS FOR AUTONOMOUS DETECTION OF A GIVEN LOCATION OR SITUATION

(75) Inventors: James S. MacLean, III, Coppell, TX (US); Bruce C. Lutz, Richardson, TX (US); Jugal Kishore Sharma, Irving, TX (US)

(73) Assignee: OnAsset Intelligence, Inc., Irving, TX (US)

( * ) Notice: Subject to any disclaimer, the term of this patent is extended or adjusted under 35 U.S.C. 154(b) by 921 days.

(21) Appl. No.: 11/618,031

(22) Filed: Dec. 29, 2006

(51) Int. Cl.
*H04Q 5/22* (2006.01)
(52) U.S. Cl. .................. 340/10.5; 340/10.3; 340/5.31
(58) Field of Classification Search .............. 340/10.5, 340/540, 10.3; 455/546.4; 702/57
See application file for complete search history.

(56) References Cited

U.S. PATENT DOCUMENTS

| | | | |
|---|---|---|---|
| 6,281,797 B1 | 8/2001 | Forster et al. | |
| 6,734,796 B2 | 5/2004 | Forster et al. | |
| 6,885,288 B2 * | 4/2005 | Pincus | 340/10.51 |
| 7,016,730 B2 * | 3/2006 | Ternes | 607/17 |
| 7,076,255 B2 | 7/2006 | Parupudi et al. | |
| 7,501,944 B2 | 3/2009 | Hyde | |
| 2001/0052850 A1 * | 12/2001 | Zimmerman | 340/572.1 |
| 2002/0017989 A1 * | 2/2002 | Forster et al. | 340/540 |
| 2003/0144985 A1 * | 7/2003 | Ebert | 707/1 |
| 2005/0181723 A1 * | 8/2005 | Miller et al. | 455/12.1 |
| 2006/0152357 A1 * | 7/2006 | Hyde | 340/539.13 |
| 2006/0176175 A1 * | 8/2006 | Evans et al. | 340/539.22 |
| 2008/0004040 A1 * | 1/2008 | Bogart | 455/456.1 |
| 2009/0117919 A1 * | 5/2009 | Hershenson | 455/456.4 |

* cited by examiner

*Primary Examiner*—Benjamin C Lee
*Assistant Examiner*—Quang Pham
(74) *Attorney, Agent, or Firm*—Bruce C. Lutz

(57) ABSTRACT

A method and apparatus is provided for sensing a given situation such as the presence of operational aircraft for deactivation, or other modification, of a device such as wireless communication circuitry signal transmission circuitry while in the presence of the operational aircraft. The sensing of a situation may be by the presence of a predetermined signal, the arrival at a given location, a measurable change in air pressure and so forth. The sensor circuitry, upon detecting conditions suggestive of operational aircraft, operates to activate, deactivate or otherwise modify the performance of a device while in the presence or immediate vicinity of aircraft or other predetermined situation.

9 Claims, 4 Drawing Sheets

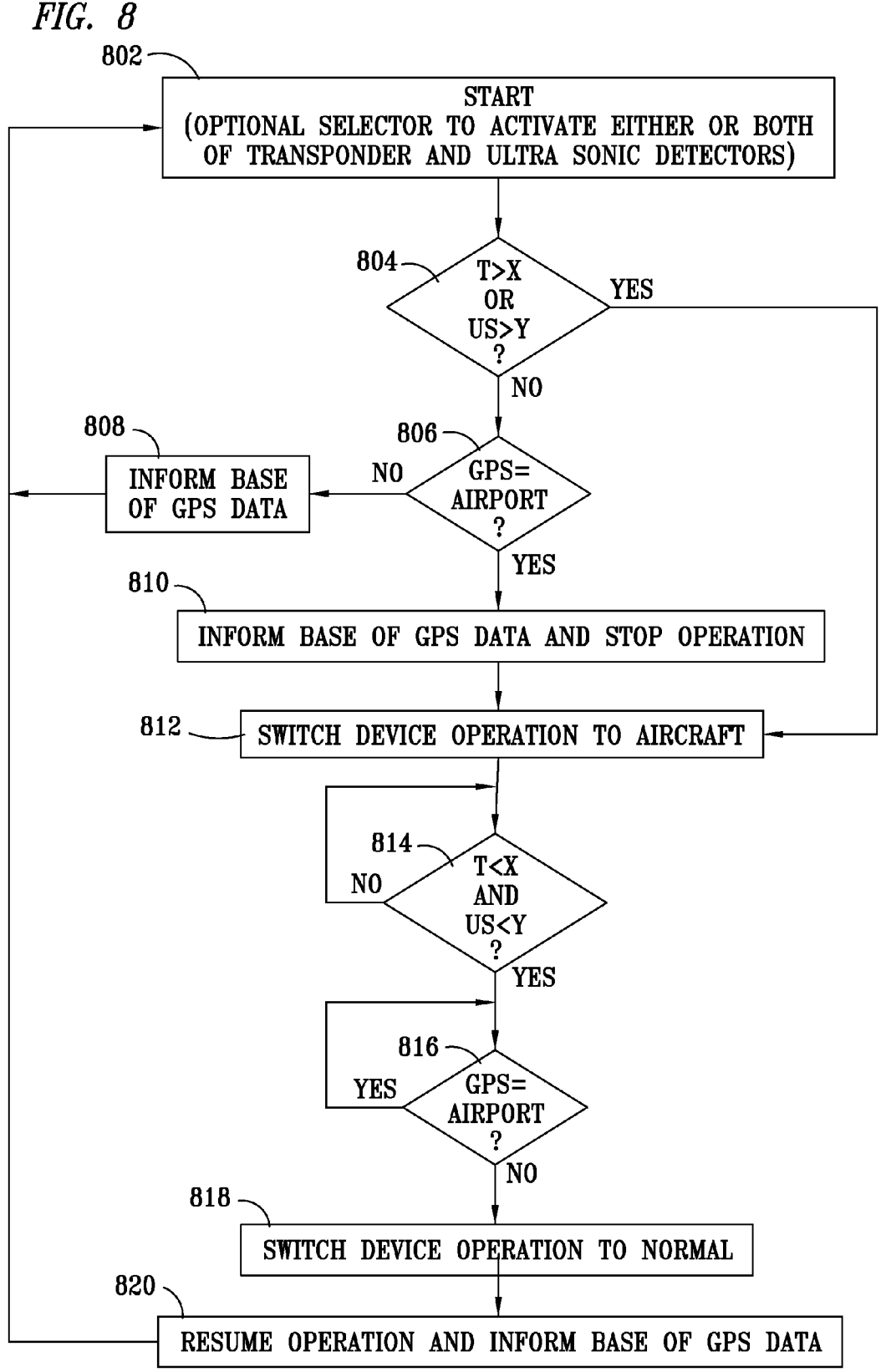

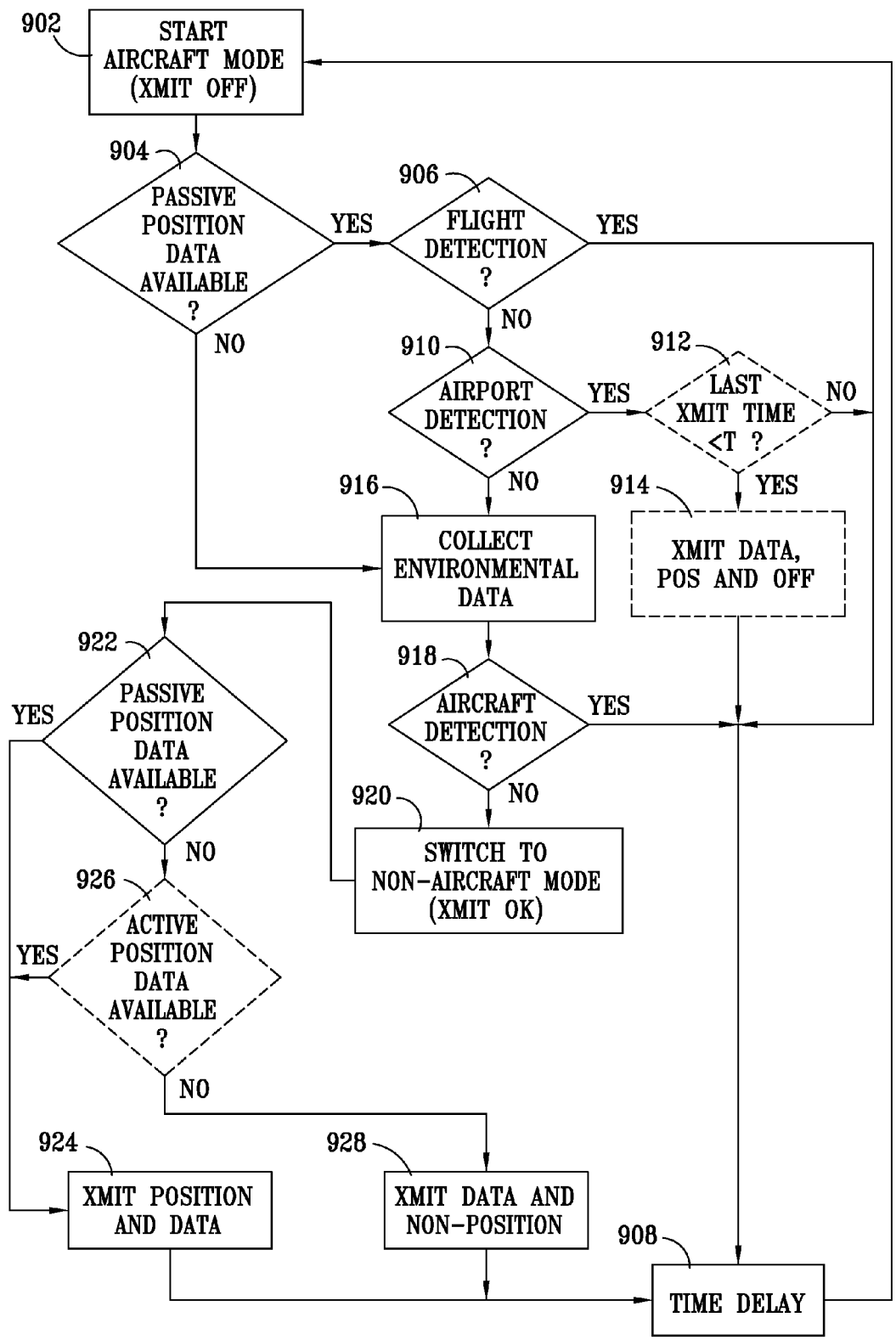

METHOD AND APPARATUS FOR AUTONOMOUS DETECTION OF A GIVEN LOCATION OR SITUATION

FIELD OF THE INVENTION

The present invention relates generally to a method of automatically modifying the operation of a device, such as a portable electronic device (PED), as a function of whether or not the device is in the nearby presence of or is within an operational aircraft.

DESCRIPTION OF THE RELATED ART

Federal Aviation Regulations (FAR) Sec 91.21 restricts the use and operation of wireless communication circuitries and other portable electronic devices (PED) aboard aircraft unless it has been previously determined that the specific PED will not cause interference with the navigation or communication system of the aircraft wherein the PED is going to be used. It is currently common practice for airlines to require passengers to manually shut off PEDs prior to take off. Certain devices, typically those that are not capable of wireless transmission, are then allowed to be switched on when the aircraft is in a stable cruising state.

Portable electronic devices are prolific and increasingly used outside the proximity of humans. Present devices do not have the ability to autonomously recognize their presence onboard an operational aircraft such that the transmitting portion of that device could be shut down without human intervention.

One emerging application is use of Active RFID and similar technologies (such as cell phone based triangulation or Wi-Fi/Wi-MAX) to track shipments throughout the freight transportation system or supply chain. Wireless communication circuitry may comprise a portion of present day RFID (Radio Frequency IDentification) tags when the entity using the tags wants to track the geographical position of the tags through the additional use of GPS (global positioning system) or other location determining circuitry. If such tags are attached to items being shipped by air, the wireless communication circuitry portion of these tags must be deactivated or otherwise modified while in the presence of operational aircraft. If such deactivation comprises human intervention, there is a likelihood that such deactivation will sometimes be overlooked. Further, it is likely that reactivation will be sometimes overlooked. Thus it would be desirable to have circuitry that can detect a situation such as the presence of operational aircraft and automatically deactivate at least the wireless communication circuitry signal transmission capability while the tag remains in the immediate vicinity of operational aircraft.

It may also be desirable to prevent the operation of other, normally non-electronic, devices such as cigarette lighters in certain situations such as the location of a refinery or other location likely to contain explosive fumes.

There also may be instances where the operation of a device is advantageously merely modified, as opposed to being deactivated, in certain situations such as the presence of operational aircraft. As mentioned above, wireless communication circuitry signal transmission is prohibited in aircraft. However, there is no known restriction to the reception of signals by a wireless communicator such as text messaging.

Finally, it may be desirable to activate certain devices only in certain locations or situations. An example is an alarm that might be activated whenever a location or area is entered that contains radioactive materials. The alarm may be sounded based upon both previously known and mapped radioactive sites and/or presently sensed data indicating radioactivity.

It would thus be desirable to have a method or technique of detecting situations such as movement, pressure changes, sound and transponder signals indicative of aircraft and operational aircraft and providing an output signal that may be used to activate, deactivate or otherwise modify the performance of a device while within or otherwise in the immediate vicinity of the given situation.

BRIEF DESCRIPTION OF THE DRAWINGS

For a more complete understanding of one or more embodiments of the present invention and the advantages thereof, reference is now made to the following descriptions taken in conjunction with the accompanying drawings, in which:

FIG. 8 exemplifies, a flow diagram setting forth the logic that may be used in accordance with one embodiment of the invention to program an incorporated microprocessor when incorporating the present invention in a device, when it is initially assumed that the device is not in the vicinity of operational aircraft; and FIG. 9 exemplifies, a flow diagram setting forth logic that may be used in accordance with an alternative embodiment of the invention to program an incorporated microprocessor when incorporating the present invention in a device, such as a RFID tag as illustrated in FIG. 7, when it is initially assumed that the device is physically located within an operational aircraft.

DETAILED DESCRIPTION

Figure 1:
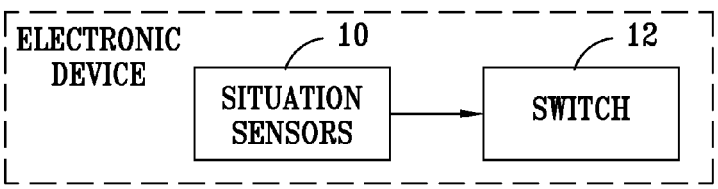
FIG. 1 exemplifies, in block diagram format, circuitry for operating a switch, incorporated in an electronic device, upon detection of a nearby detectable situation in accordance with one embodiment of the invention.

In FIG. 1, a sensor 10, that senses or otherwise detects the presence of a predetermined situation, such as predefined location or an operational aircraft in the immediate vicinity, provides a signal to a switch 12 when a characteristic such as the amplitude of the sensed signal exceeds a predetermined value. The sensor and switch comprises a portion of the electronics in a device 14 such as a cell phone, RFID tag or other device that needs modification when detecting a situation. Such a situation may be the detection of aircraft or a location where aircraft are commonly located and where the transmission of RF signals could potentially interfere with electronics onboard the aircraft. When terms, such as "immediate vicinity" or "proximate an aircraft" are used hereinafter, the terms are meant to be indicative of a distance or closeness to an aircraft or a geographical location whereby RF transmissions from a device, that is not an aircraft entity, could potentially cause interference with aircraft electronics when an aircraft becomes or is operational. In a similar manner, terms such as "remote from operational aircraft" is intended to mean at least a distance from operational aircraft or from a location where aircraft are typically operational that RF transmissions from a device that is not part of an aircraft entity are unlikely to cause interference with aircraft electronics.

Figure 2:
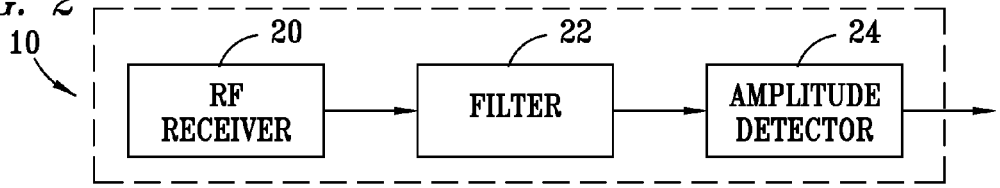
FIG. 2 exemplifies, in block diagram format, the circuitry of FIG. 1 wherein the sensor detects the strength of an aircrafts' transponder signal.

One method to implement the operation of sensor 10 of FIG. 1 is to use a RF receiver 20 as shown in FIG. 2 to detect and output FAA (Federal Aviation Authority) required aircraft transponder signals to a filter 22. Such transponder signals typically have a center modulation frequency of either 1030 or 1090 MHz. Filter 22 passes only those frequency signals in one or both narrow bands, corresponding to the transponder center modulation frequency in a target aircraft, to an amplitude detector 24. When the amplitude of the detected transponder signal exceeds a predetermined value X, it may be correctly assumed that the circuitry of FIG. 2 is near an aircraft that is operating a transponder.

Figure 3:
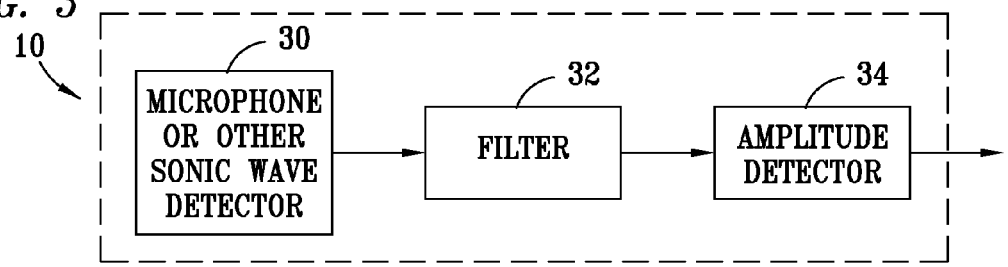
FIG. 3 exemplifies, in block diagram format, the circuitry of FIG. 1 wherein the sensor detects the magnitude of ultrasonic signals generated by an aircraft's engine.

As is known, all aircraft engines, and especially jet engines generate sound (sonic) waves when operational. In FIG. 3, a block 30 represents a sonic wave detection device such as a microphone. The sonic waves detected by block 30 are passed through a filter 32 to a signal amplitude detector 34. It has been found that jet engines consistently generate sounds in the range of 100 to 350 KHz from the time of takeoff until they are throttled back for landing. This sound is indicative of the speed of the jet engine and varies slightly in frequency range from one type of jet engine to another. The filter 34 operates to remove a majority of the signals outside this range for the purposes of this invention. As may be surmised, at engine idle the sound waves generated are typically less than 100 Khz and thus would not be detected by the sensor as described in connection with this figure.

Figure 4:
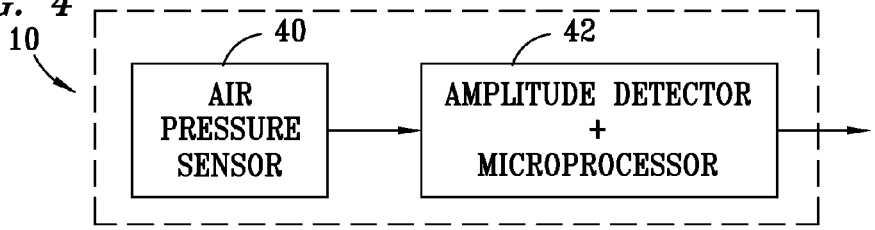
FIG. 4 exemplifies, in block diagram format, the circuitry of FIG. 1 wherein the sensor may be used to detect cabin pressure and/or rate of change of cabin pressure as a determination of whether or not an aircraft is operational in one embodiment of the invention.

It is known that a given range of cabin pressures are maintained between takeoff and landing of an airplane. It is further known that to assure a proper seal of all the doors on an aircraft, a positive pressure, relative atmospheric pressure, is generated at least by takeoff time. Most modern aircraft accomplish this checking of door seals soon after the engines are brought up to speed. As the aircraft climbs, the outside air pressure decreases. In order to prevent a dangerous pressure differential, the inside cabin pressure is also decreased as the aircraft climbs. This rate of pressure change, in commercial jet aircraft, is typically in the range of 10.2 to 17.0 mbar/min (millibars per minute) for altitudes under 5000 feet. This last stated pressure change equates to approximately 300-500 feet per minute of altitude change. As is well known, the rate of pressure change, for a given climb rate, drops as a function of altitude. However, this rate of change, up to the minimum allowed cabin pressure, exceeds the rate of change in pressure that a pressure sensing device, similar to FIG. 4, would experience on the ground and can therefore be used to detect starting or ending flight patterns. Thus, in accordance with FIG. 4, a cabin air pressure sensor 40 may be used to provide a signal to an amplitude detector 42. The detector 42 may further comprise a microprocessor that detects or otherwise monitors the sudden increase in cabin pressure whereupon a signal is provided to activate a switch like switch 12 of FIG. 1. In a similar manner, the relatively rapid increase in pressure as the aircraft is coming down in altitude for landing may be used to generate a signal to deactivate switch 12. Further, the rate of change of pressure when taking off and climbing to a flight altitude may be used to determine rate of climb.

Figure 5:
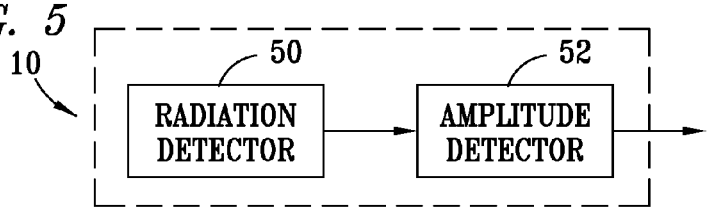
FIG. 5 exemplifies, in block diagram format, the circuitry of FIG. 1 wherein the sensor detects the level of nuclear radiation in the vicinity.

In FIG. 5, a block 50 comprises a nuclear radiation detector. A further block 52 senses the level of radiation detected by detector block 50 and provides an output when the level detected exceeds a predetermined value in a manner similar to the amplitude detectors of FIGS. 2 and 3.

Figure 6:
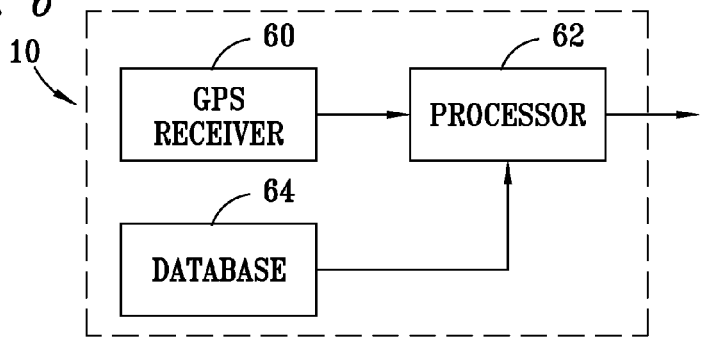
FIG. 6 exemplifies, in block diagram format, the circuitry of FIG. 1 wherein the sensor detects GPS signals to provide present location data and compares the detected location with a geographical database whereby situation locations, such as airports, may be ascertained.

In FIG. 6, a block 60 comprises a GPS type receiver that provides a set of coordinates indicating the geographical position of block 60. These coordinates may be either X and Y data (i.e., planar) or X, Y and Z data (i.e., spatial). The XYZ data thus includes altitude data. A computer or microprocessor 62 receives the GPS data and compares the data to that stored in a database 64 to determine if a given situation has occurred. In the example of aircraft, the database 64 may comprise airports, or just critical portions of airports such as cargo loading docks and so forth. When a match is found, the microprocessor 62 will provide an output to operate a switch such as switch 12 of FIG. 1. For efficiency purposes, the microprocessor may store the last coordinates provided by block 60 and/or the last match obtained from database 64 to be first checked before searching the complete database 64. Thus, if there has been no significant movement of the GPS receiver 60 since the last query of GPS received positional data, such a determination may be quickly made from the previously recorded data. The GPS receiver may be designed or otherwise modified to provide a predetermined error signal when the received signal is less than a given signal strength.

Figure 7:
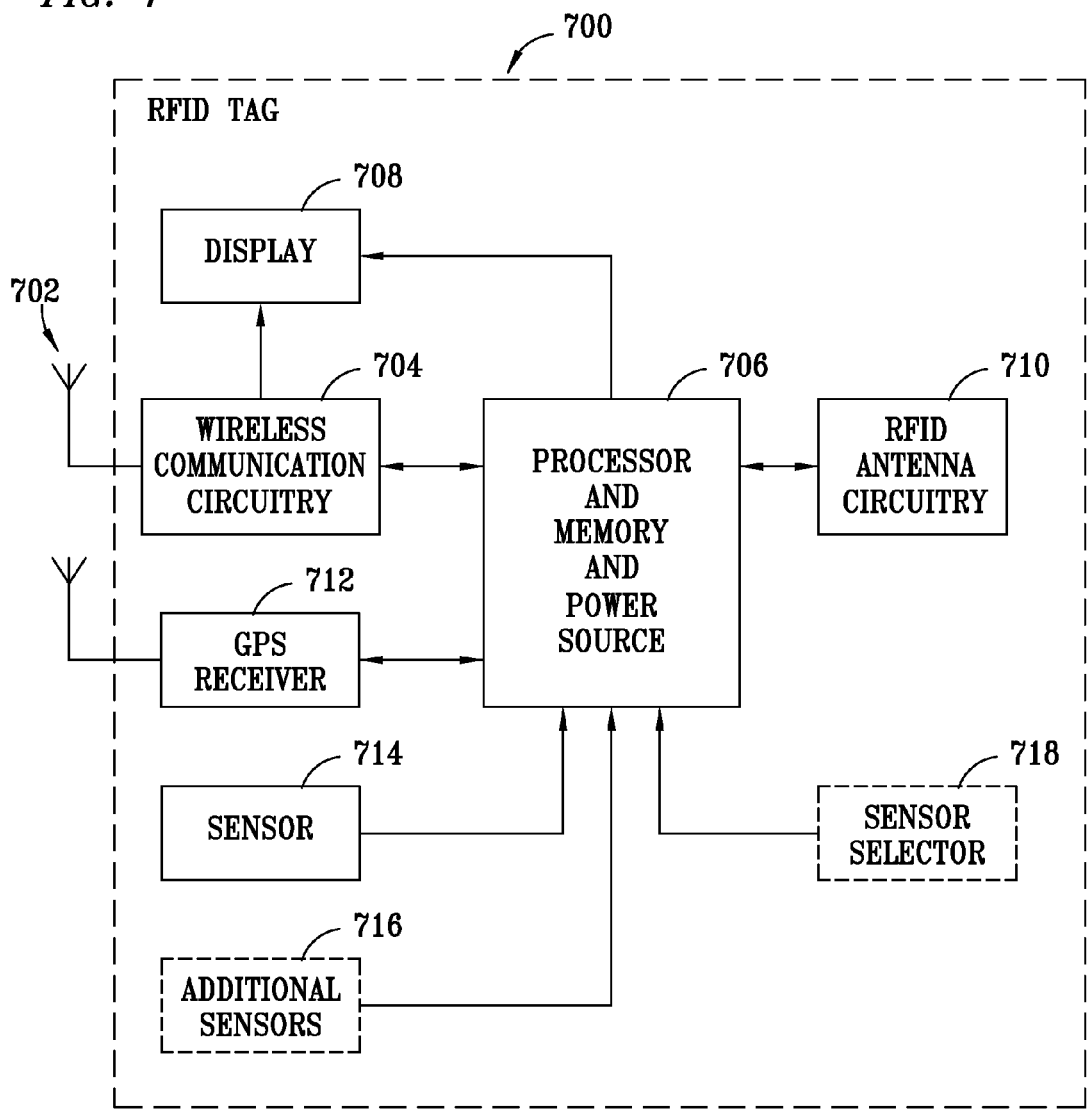
FIG. 7 exemplifies, in block diagram format, the major components utilized in an RFID tag incorporating the present invention to deactivate the wireless communication circuitry transmission portion of the tag when the tag is near an aircraft facility or inside or otherwise in the immediate vicinity of operational aircraft in accordance with one embodiment of the invention.

One or more of the above sensors may be used in products to detect a given situation and modify circuit operation accordingly. One example might be a RFID tag whose RF transmitting circuitry is maintained in an OFF or aircraft condition when in the detected presence of aircraft. In other words, the RF transmitting circuitry is only activated when each of the sensors being used to detect a given situation have outputs that when logically combined provide an indication that it is safe to operate RF transmitting circuitry. In FIG. 7, a block 700 comprises an RFID tag having an antenna 702 for transmitting and receiving signals in conjunction with wireless communication circuitry 704 operating as part of a location tracking system portion of tag 700. A microprocessor or computer chip 706 is used to control the wireless communication circuitry 704 as well as other operations within tag 700. Although not specifically shown, the tag is typically powered by some energy source such as a battery and the processor 706 will have access to memory for operational software and data storage. A display 708 receives data to be displayed from both the wireless communication circuitry block 704 and the processor block 706. A block 710 is in bilateral communication with the processor 706. Block 710 comprises the RFID antenna and associated circuitry for identifying the tag 700. A block 712 comprises location sensing circuitry, such as a GPS receiver, that may be used in tracking the location of tag 700. Block 712 is also shown to be in communication with processor 706. A sensor block 714, corresponding to one or more of sensors 10, provides data to processor 706 to be used in determining proximity to an operational aircraft. For reliability and/or redundancy, a dashed line block 716 represents additional sensors that may be used instead of or in combination with sensor 714 to determine whether a situation, such as aircraft proximity, exists with respect to tag 700. When more than one sensor is used with a product or device whose operation is modified while in a predetermined situation, it may be desirable to be able to select how many and which sensors are to be used in conjunction with that maintaining detection of the situation. Thus an optional dash line block 718 is shown providing a sensor selector input to processor 706. The display block 708, may be used to provide a visual indication that the one or more sensors are receiving signals indicative of being in a given situation such as close proximity to operational aircraft. The display would provide this information immediately subsequent to operation of the sensor selector 718 or alternatively through the use of a momentary contact test button (not shown). The additional sensors block 716 may include sensors used to monitor the condition of the object to which the tag is attached. For example, if the tag is attached to medical container, a temperature sensor may be used to monitor the medical environment within or adjacent the container.

A flow diagram in FIG. 8 represents one preferred embodiment of logic steps that may be used in connection with programming processor 706 of FIG. 7 to detect the situation of being at an airport or otherwise in proximity to, or within, operational aircraft. As presented, the logic of this flow chart will operate with either or both of transponder 20 and sonic detector 30, as presented in FIGS. 2 and 3, respectively, in combination with location determining circuitry such as the GPS circuitry block 712. In a start step 802, a selection may be made to activate either or both of the sonic and transponder signal detectors. It may be assumed that, to conserve battery power, the processor 706 only requests input data at periodic intervals such as every 10 to 60 minutes. The time interval may be much longer or shorter in accordance with specific applications of the tag and/or desires of a tag owner entity. Further, since typically the requests for data will come from processor 706, the periodic interval may be easily adjusted by changing the programming of the processor 706. Likewise, battery power may be conserved by programming processor 706 to intelligently actuate individual sensors only when logically a given sensor is likely to provide appropriate data and not otherwise.

Even though typically a GPS receiver sensor would detect the presence of an airport through comparison with stored location data before a transponder sensor would detect nearby aircraft, it is possible that a RF transmitting device, like RFID tag 700, could be placed on an aircraft ready for takeoff between processor requests for GPS data. Further, the tag 700 may be placed next to certain metals or other cargo, on the way to an airport, in such a manner that the GPS receiver 712 cannot obtain a reliable signal.

Therefore, in accordance with a next step decision block 804, as long as neither the transponder signal nor the ultrasonic signal exceeds respective predefined amplitudes "X" and "Y", a check is made in a next decision block 806 to determine if data from the GPS receiver 712 indicates proximity to an airport. As used herein and with respect to airports, the term proximity may be defined as a predefined distance from one or more geographical coordinates used to define the boundaries of predetermined portions of airport property. If there is no indication of airport proximity, a wireless communication circuitry call is made to a computer or communications base to provide an indication of the location of the tag 700 as set forth in a next step block 808. The logic process then provides for a return to the start block 802 to await the next periodic time of request for data.

If, in decision block 806, there is a determination of airport proximity, a next step, as set forth in a block 810, is to inform a base computer (not specifically shown) of the GPS location data and to inform the base that reporting will be stopped until further notice. The process then continues to a next step 812 to switch circuitry of a device incorporating this logic to an aircraft or non-transmit status. In this mode or status, at least wireless communication circuitry transmissions will be prevented.

If, in decision block 804, it is determined that either the transponder signal is greater than X or the ultrasonic signal is greater than Y, the likelihood of the tag being within an operational aircraft is very high. Since wireless communication circuitry transmissions are considered inappropriate in operational aircraft in accordance with FAA regulations, the process will bypass the step of informing a base computer that the tag is near an airport and is intending to stop operations and go directly to block 812 to switch operation to an aircraft status.

It should be noted that there may be instances where the transponder and the ultrasonic detectors might detect an aircraft transponder signal characteristic of greater than a predetermined value of aircraft flying directly overhead when a device incorporating these detectors is nowhere near an airport. Thus, at periodic intervals, a check will be made of the transponder and the ultrasonic detectors. If the output of either remains for a predefined period of time at greater than the respective X and Y values, the process will await the next periodic request for data to make this check again. The GPS sensor presently requires more battery power to obtain data than do the transponder and ultrasonic sensors, thus no request is made for GPS data until no significant transponder or ultrasonic signals are detected.

A further decision block 816 activates the GPS receiver after a check of the transponder and ultrasonic detectors, in block 814, indicates that neither are providing output signals of greater than the predetermined values. Since the ultrasonic signal detector may not provide an output signal with the low engine rpm in landing and while taxiing down the runway and since the aircraft transponder could be turned off upon landing, the step 816, in checking location data for an airport, prevents accidental transmission of wireless communication circuitry signal while the tag could potentially be within an aircraft.

Once it is determined, in decision block 816, that the tag 700 is not and/or no longer in proximity to an airport, the device is switched to normal operation in a step 818. Next, in step 820, a base computer is informed of GPS data and the process returns to the start block 802 to periodically inform the base of tag location.

As is known, GPS receiver accuracy and sensitively has improved almost every year. Thus, if the GPS receiver, of tag 700, was appropriately designed, the situation of detecting aircraft could be accomplished without further sensors assuming that the receiver could typically receive satellite signals from within an aircraft. This may be accomplished by checking XYZ location data to first ascertain that the tag 700 is in the vicinity of an airport. A next step may involve turning OFF the tag transmitter portion of block 704 if the tag is in the vicinity of an airport. If, at any time, a calculated distance between subsequent GPS location readings divided by time between readings equates to a speed of greater than, for example, 90 mph, the tag processor can ascertain that the means of tag conveyance is very likely an aircraft. This assumption, by processor artificial intelligence, may be solidified by checking the rate of climb and/or altitude from GPS readings. The tag transmitter would only be turned to normal operation when the processor ascertained that not only had calculated speed between GPS readings dropped to highway speeds or less but additionally location did not coincide with an airport location in the database.

All aircraft transponder signals include data as to measured atmospheric pressure in the vicinity of the aircraft. Thus, the pressure sensor 40 of FIG. 4 may be used in combination with the RF receiver circuitry 20 of FIG. 2 and the processor 706 of FIG. 7 to monitor the difference in pressure between the cabin and atmospheric as an indication of the device, such as tag 700, being in flight or on the ground.

While the flow diagram logic of FIG. 8 was based upon the assumption that, upon startup, a device, such as tag 700, incorporating aircraft detection circuitry, is not in the vicinity of operational aircraft, it may be equally appropriate to assume, upon startup, that the device is in the vicinity of operational aircraft. In other words, if the device comprises wireless communication circuitry, no RF transmissions are permitted until none of the active sensors provide any indication of being in the immediate vicinity of operational aircraft. This is the logic used in the flow diagram of FIG. 9.

In FIG. 9, the number 902 is used to designate a block that sets a device, such as tag 700, to a state where RF transmissions are prevented. As shown in the flow diagram, since this logic is for an RFID tag incorporating a wireless communication circuitry for reporting position, the device is set to aircraft mode and the RF transmission capability is set to OFF. In a next step decision block 904, a check is made to see if passive position or location data or information is presently available. Such passive data may, as an example, be in the form of GPS received data. Passive position data may not be available because, as an example, the device may be surrounded by wireless signal absorbing material, such as certain metals, in the form of other transportable packages and/or by metal or other wireless signal absorbing material in the transporting entity itself.

If such position data is available, a next step is shown in a decision block 906 for ascertaining if the device is in flight. Such a determination may be made by examining the distance traveled between consecutive checks of location information a given time apart. Such information may be used to ascertain speed of any form of transportation used to move the device. As an example, if the speed is calculated to be more than 90 mph, the chances are very great that the device is in an aircraft. If the speed is calculated to be more than 200 mph, it would only be realistic, at this time, to assume that the transportation device is an aircraft.

As is known, GPS data may also be used to determine altitude above ground level as well as the height above sea level. Thus if the altitude above ground level is determined to be more than some value such as 100 feet, the chances are very great that the device is in an aircraft. If the altitude is calculated to be more than 7000 feet above sea level, it would only be realistic, at this time, to assume that the transportation device is an aircraft. Therefore, if position data is available indicating by any, or all, of the above calculations to indicate the device is being transported by an aircraft, the next step, in a time delay circuit represented by block 908, is to wait a predetermined time before returning to the start block 902 to again check as to whether or not the device is allowed to transmit RF signals.

If, in block 906, it is determined that the device is less than given heights above ground or sea level and is moving less than a given speed, the next step, in a decision block 910, is to determine whether or not the device is in the vicinity of an airport. Data pertinent to airport locations is readily available. Thus, since position data has already been determined to be available in block 904, such a determination may be readily made by comparing recently received data with stored data on airport locations. If the device is in an airport location, the next step, in order to avoid creating a problem with interfering RF transmissions, may be to return to delay block 908.

An optional next step decision block 912 is shown with dash line borders. This step may be taken in the event that the user of an RFID tag wants to take a very slight chance of interfering with aircraft communications. In decision block 912, a determination is made as to the time elapsed since the time of the last normal RF transmission by the device. If the last transmission was less than some small amount of time "t", such as 5 minutes earlier, it is very unlikely that the device has not only entered airport property but additionally has been unloaded from a transportation device like a truck and even further has been loaded onto an aircraft that has had the access doors closed and is operational. With some form of the above referenced criteria, it may be assumed that if the time t has not been exceeded, a next step 914 is used to transmit data and position along with a sign-off message indication that further transmissions will be discontinued for an indeterminate period of time in view of the probability of being near operational aircraft. The logic flow process then returns to delay block 908 to await the next check for operability.

As may be ascertained, if the time since the last normal transmission that does not include a sign-off message exceeds t, the logic process goes directly from decision block 912 to the time delay block 908.

When, in decision block 910, it is determined that the device is not near an airport, the next step is an environmental data collection block 916. This logic step block 916 is also entered when, in decision block 904, it is determined that passive position data is not available. The environmental data collected may be data like aircraft transducer signals mentioned in conjunction with the RF sensor 20 of FIG. 2, the ultrasonic wave signals mentioned in conjunction with the sonic wave sensor 30 of FIG. 3 and/or the air pressure sensor 40 mentioned in conjunction with FIG. 4. If any of these sensors provide outputs exceeding predetermined values, thus indicating, in a next step decision block 918, that the device is almost certainly within the confines of an operational aircraft, the logic process returns to the time delay block 908 and awaits the next time check of conditions. The output signals, used in determining the detection of aircraft, may comprise the detected transponder or ultrasonic signals exceeding given values. With respect to the measured pressure, if the detected rate of change of pressure equates to a change in altitude of greater than 250 ft/minute, it may safely be assumed that the device is within the confines of an aircraft. Also, if a sustained pressure is detected—that equates to an altitude of between 6000 and 7500 feet above sea level, the normally maintained aircraft cabin pressures for high altitudes, it is very likely that the device is in an aircraft unless the aircraft has crashed into a mountain at a high altitude or is in a vehicle transiting a mountain pass. (The flow diagrams as presented herein, do not consider RF transmissions from electronic devices to be a problem for crashed transportation aircraft. Other device intelligence is readily available for detecting the vehicle transit situation.)

If, on the other hand, there is no sensed indication of being in the immediate presence or vicinity of operational aircraft in decision block 918, the next logic step, in a block 920, is to switch the device to Non-Aircraft mode. In other words, a mode where RF transmissions are acceptable.

After the device is switched to Non-Aircraft mode, a next step decision block 922 provides a determination of whether or not passive position data is available. If so, the logic process continues to a transmit position and data block 924. In the process of completing the 924 step, position data as well as any other sensed data is transmitted to a base computer or data storage network in a manner similar to that described in conjunction with FIG. 8. The other sensed data may comprise information such as temperature of the environment or even internal temperature of a package to which the transmitting device is attached or otherwise associated with. The logic flow process then continues to block 908 to await the next timed check of position.

If passive position data is not obtainable in block 922, the process continues in an optional decision block 926 where a check of position is made using active techniques. An example of active techniques may include device requested wireless communication circuitry transmission tower triangulation data. Another example may include Wi-Fi requested location data.

If position data is obtainable by active means as determined in block 926, the process continues to the transmit block 924 and hence to time delay 908. If active position data is not available or if the optional block 926 is not used, the process operates to transmit any data, such as the temperature mentioned above, via a block 928. This transmission would include an indication that position data was not available at that time. The logic process then continues to the delay block 908.

While the examples set forth above have used an RFID tag in conjunction with items to be shipped by air, the invention applies to any item that needs to have its operational capabilities modified during predetermined detectable situations and returned to normal when those predetermined situations no longer exist. Thus the radiation sensor 50 of FIG. 5 may be used, with appropriate switch circuitry, to provide an alarm as well to as activate a recorder for keeping a record of level of nuclear radiation and time within a level of radiation that exceeds a predetermined value.

In summary, the present invention comprises a method and apparatus for sensing a given situation such as the presence and/or likely presence of operational aircraft. The sensing of a situation may be by the detection of a predetermined signal, the detection of arrival at a given location likely to encompass the situation, the detection of a change in air pressure, detection of a sound and so forth. The sensing of an operational aircraft may be accomplished by any one or more of at least detecting an airplane transponder signal, ultra sonic waves generated by jet engines, GPS or other location data and sudden changes in aircraft internal pressure as occurs in an airplane immediately after the cabin doors are closed or opened as well as pressure changes occurring during ascent to flying altitudes and descent just prior to landing. Additionally, the device may be able to sense flight, independent of its ability to sense the aircraft, using passive means such as GPS to determine its altitude and velocity. The sensor circuitry, upon detecting the occurrence of a condition suggestive of operational aircraft, outputs a signal that may be used to activate, deactivate or otherwise modify the performance of a device while in the presence or immediate vicinity of aircraft or other predetermined situation. Monitoring of data output by the sensors in combination with appropriate logic provides artificial intelligence sufficient to determine when to return the device to normal operation when no longer in the immediate vicinity of the situation such as an operational aircraft.

As will be apparent to those skilled in the art, a manual override of the circuitry described above may be desirable in certain devices such as cell-phones. Such an override would most desirably require something like continuous pressure on an override button whereby RF transmissions would not be likely to occur from operator forgetfulness (in other words "accidentally"). In an apparatus containing such an override circuit, the apparatus operation would be considered "normal" when the override circuit is not activated and "abnormal" when the override circuit is activated.

Although not specifically shown, the sensor 10 may alternatively comprise a wireless receiver, similar in design to that of FIG. 2, which detects a remotely generated turn-OFF command. When this detected turn-OFF command is of sufficient strength, an output signal may be generated to modify the circuit operation. As an example, a beacon or transmitter in an aircraft may be activated to transmit on a predetermined frequency whenever the aircraft is operational and the detection of that signal may be used to prevent RF transmissions from devices detecting said predetermined frequency. Such a turn-OFF command signal may also be generated from other electronic wireless sources.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. RF transmitting apparatus comprising:
normally OFF_RF signal transmission circuitry;
condition sensing means operable to determine when said RF signal transmitting apparatus is in the immediate vicinity of aircraft; and
modifying means, connected to said RF signal transmission circuitry and said condition sensing means, said modifying means operating, only when each of said condition sensing means determines said RF signal transmitting apparatus is not in the immediate vicinity of aircraft, to alter the signal transmission capability of said RF signal transmission circuitry to an ON condition.

2. RF Transmission apparatus comprising:
sensing means operable to determine when said apparatus is located remote from operational aircraft; and
circuit modifying means, operable in response to a given output from said sensing means, for permitting RF transmissions from said apparatus only when said sensing means determines that said apparatus is physically located where RF transmissions will not adversely interfere with operational aircraft.

3. RF Transmission apparatus comprising:
a circuitry power source;
situation-sensing circuitry operable to provide a RF transmitter turn ON first output signal only while not in the immediate vicinity of a given situation, said situation-sensing circuitry being operable to sense at least a plurality of signals from a list of transponder signals, aircraft cabin pressure measuring signals, received apparatus location signals, accelerometer signals and aircraft engine-generated ultrasonic frequency detected signals; and
modifying means operable to enable the ability to transmit RF signals from said apparatus only while said sensing circuitry is providing said transmitter turn ON first output signal.

4. Operational aircraft-aware apparatus comprising:
- a plurality of sensing means operable to provide an output signal operable to activate an RF transmitter only when all of said sensing means provide indications of not being in the immediate vicinity of operational aircraft; and
- further means, operable to return said RF transmitter to an inactive state when signals are not being received from any of said sensing means indicative of said apparatus not being in the immediate vicinity of operational aircraft.

5. An apparatus for modifying RF transmission capability in a RFID tag, the apparatus comprising:
- sensing means comprising circuitry operable for detecting any of a plurality of signals each indicative of not being in the presence of operational aircraft;
- logic circuitry for generating an output signal operable to activate RF signal transmission circuitry only during the presence of all of said plurality of signals; and
- switch means, operable in response to said output signal from said sensing means, for activating said RF signal transmission circuitry.

6. RF transmission apparatus comprising:
- a plurality of sensing means; and
- logic means responsive to outputs of each of said sensing means, said logic means being further operable to permit RF transmissions only after all outputs from said sensing means provide a determination that said apparatus is located remote enough from operational aircraft whereby RF transmissions emitted from said apparatus is unlikely to cause interference with operational aircraft.

7. Operational aircraft-aware apparatus comprising:
- at least one programmed computer unit;
- a plurality of sensing means, each operable to provide output signals to said at least one programmed computer unit only in response to instructions from said at least one programmed computer unit;
- normally non-activated RF transmitter apparatus; and
- activation means, operable to activate said RF transmitter apparatus only when all output signals received by said at least one programmed computer unit from said plurality of sensing means logically provide an indication of operational aircraft-aware apparatus not being in the immediate vicinity of operational aircraft.

8. Apparatus as claimed in claim 7 comprising, in addition
- a plurality of sensing means, each operable to provide output signals to said at least one programmed computer unit only in response to instructions from said at least one programmed computer unit; and
- means operable to reconfigure sensing means actively used by said programmed computer unit to ascertain aircraft awareness as a function of recently sensed data.

9. Apparatus as claimed in claim 8 wherein battery life is extended through the de-activation of unused sensors.

* * * * *